United States Patent [19]

Foster

[11] Patent Number: 4,648,061

[45] Date of Patent: Mar. 3, 1987

[54] ELECTRONIC DOCUMENT DISTRIBUTION NETWORK WITH DYNAMIC DOCUMENT INTERCHANGE PROTOCOL GENERATION

[75] Inventor: Gregory J. Foster, Austin, Tex.

[73] Assignee: International Business Machines Corporation, Armonk, N.Y.

[21] Appl. No.: 831,089

[22] Filed: Feb. 21, 1986

Related U.S. Application Data

[63] Continuation of Ser. No. 440,257, Nov. 9, 1982, abandoned.

[51] Int. Cl.⁴ .................... G06F 13/00; G06F 15/16
[52] U.S. Cl. ............................... 264/900; 340/825.06
[58] Field of Search ... 364/200 MS File, 900 MS File; 340/825.06, 825.07, 825.52; 370/60, 94

[56] References Cited

U.S. PATENT DOCUMENTS

| | | | |
|---|---|---|---|
| 3,593,300 | 7/1971 | Driscoll | 364/200 |
| 3,693,161 | 9/1972 | Price et al. | 364/200 |
| 3,753,234 | 8/1973 | Gilbert et al. | |
| 3,821,713 | 6/1974 | Broadhurst et al. | 364/200 |
| 4,016,548 | 4/1977 | Law et al. | 364/200 |
| 4,330,847 | 5/1982 | Kuseski | 364/900 |
| 4,335,426 | 6/1982 | Manwell et al. | 364/200 |
| 4,363,093 | 12/1982 | Davis et al. | 364/200 |
| 4,429,299 | 1/1984 | Kabat et al. | 340/310 R |
| 4,500,960 | 2/1985 | Babecki et al. | 364/200 |

OTHER PUBLICATIONS

"Systems Network Architecture Concepts for Programmers", Jun., 1979, published by IBM Corporation.
"Electronic Information Interchange in an Office Environment", by M. R. DeSousa, IBM Systems Journal, vol. 20, No. 1, 1981, at p. 4.
"The Document Interchange Architecture: A Member of a Family of Architectures in the SNA Environment", by T. Schick et al, IBM Systems Journal, vol. 21, No. 2, 1982, at p. 220.

Primary Examiner—James D. Thomas
Assistant Examiner—Thomas C. Lee
Attorney, Agent, or Firm—Curtis G. Rose; J. B. Kraft; M. H. Klitzman

[57] ABSTRACT

An electronic document distribution network is provided having dynamic document interchange protocol generation. The electronic document distribution network has a dynamically variable number of communicating data processors at various locations, and these processors have dynamically varying data processing capabilities. Means are provided which take into account the dynamically variable nature of the distribution network in providing document interchange protocols between any two processors in the network. The invention comprises means whereby any processor in the network may establish a communications linkage with any other processor. The network further includes means whereby one of said two linked processors may present its data processing capabilities to the other of said processors over said linkage, together with means for comparing the data processing capabilities thus presented with those of the other processor and means for determining document interchange protocols based upon capabilities common to both of the linked processors. In this manner, the system provides means for dynamically generating variable document interchange protocols based upon the variable nature of communicating data processors involved in the network.

6 Claims, 5 Drawing Figures

ELECTRONIC DOCUMENT DISTRIBUTION NETWORK WITH DYNAMIC DOCUMENT INTERCHANGE PROTOCOL GENERATION

This is a continuation of application Ser. No. 440,257, filed Nov. 9, 1982, now abandoned.

TECHNICAL FIELD

This invention relates to electronic document distribution systems or networks and is particularly directed to means for providing document interchange protocols for handling the interchange of documents between communicating processors in the network which vary in number and particularly in data processing capability.

BACKGROUND ART

At the present time, one of the most rapidly expanding technologies in data processing is that of electronic document distribution to produce an automated office environment. This technology utilizes communication networks in an office-information-interchange system or electronic mail. Such a network is a complex interconnection of processing terminals or work stations of varying capabilities performing an assortment of data processing and text processing operations with respect to document production and distribution. A major problem that such networks present is the variety of interfaces and data forms which must be accommodated to functionally interconnect the various participating work stations and processors into an operational information-interchange system. In a conventional document distribution, not only must the various processing terminals be functionally interconnected but the system must provide the basic capability to enter and edit information, distribute information and print or display information. Irrespective of the network configuration, the system must be easy to use if it is to be effective. Also, the complexities of the various interface and data forms must be transparent to the users. In other words, the system must handle and distribute the documents with a minimum of operator intervention. To expect the sender of information to know very much about processor and data form requirements is unrealistic. The sender should be able to request that information be distributed. He should not have to be concerned about the expedients used in such a distribution.

To this end, the art has been developing uniform data streams which are discernible by the various processor-work stations participating in the document distribution network. Architectures have been defined which specify data stream content as well as the rules involved in the communication in the network. These data stream architectures specify the form of the information by describing the syntax and meaning of allowable elements in the data stream. Reference is made to the article entitled "Electronic Information Interchange in an Office Environment" by M. R. DeSousa, *IBM Systems Journal*, Vol. 20, No. 1, 1981, at page 4. This article describes a typical document distribution or interchange architecture which permits information to be carried from a sender to a recipient in such a network without requiring that both be interactively communicating during the distribution process. Further, it permits a sender to send information such as a document to multiple recipients with a single distribution request. Finally, the distribution architecture provides for services such as security base storage during distribution and confirmation of delivery.

In data distribution networks, a uniform data stream may be considered to comprise two major components: the above described document interchange architecture which relates to communication and processing of the document and the document content architecture which is representative of the content and format of a particular document.

The document interchange architecture involved in the distribution and processing of documents in distribution networks is described in even greater detail in the article entitled "The Document Interchange Architecture: Member of a Family of Architectures in the SNA Environment", by T. Schick et al, *IBM Systems Journal*, Vol. 21, No. 2, 1982, at page 220. Because of the wide variety of data processing equipment available in the current office environment together with the need to make document distribution network readily compatible with equipment which may be made available in the future, document distribution networks must have the capability of integrating into the system communicating processors of varying levels of data processing capabilities. Existing document distribution systems such as those described in the above mentioned articles provide for a uniform data stream whereby data processing stations or work stations with varying data processing capability may communicate with each other by following the protocol of the document interchange architecture. In my co-pending application entitled "An Electronic Document Distribution Network with Uniform Data Stream", Ser. No. 06/440,484 filed on the same day as the present application, now U.S. Pat. No. 4,532,588, I provided for a document interchange architecture and network for communications between and processing of data by terminals of varying data processing capabilities. The communication is handled through a uniform data stream which remained unaffected by the data processing capabilities of any of the communicating data processors involved in the processing.

The system of this co-pending application is of course based on the premise that a given pair of communicating processors want to communicate with each other in document exchange and processing, i.e., that the processor having the greater data processing capabilities wants to communicate with the processor having the lesser capabilities. In a document distribution network, this may often not be the case. For example, let us assume that a communicating processor work station in Dallas, Tex. wishes to communicate with another communicating processor in Macon, Ga. In order for the work station in Macon to be able to completely handle the document communication and processing requirements with respect to the document which the Dallas processor wishes to communicate, the work station in Macon must have distribution, application processing and document library services capability. However, in extensive document distribution networks, communicating processor work stations are being continuously and dynamically added to the system, removed from the system as well as having their respective processing capabilities continually changed, either upgraded or downgraded. For instance, on a given day the communicating data processor work stations at a given location may have only document library services capability but two or three days later capabilities of the particular work station are enhanced so that it now includes distribution services capabilites. In another instance, a given communicating processor work station may provide library services only during certain time periods because these library services may be available to the processor on only a time shared basis. As a result, in such a dynamically variable document distribution system or network, the most that a given communicating processor work station is likely to know or have available with respect to the capabilities of any other work station is that communicating processor work station exist at a given location.

Thus, there appears to be a need in document interchange networks having data processing work stations or terminal with dynamically variable capability for expedients whereby any linked processors may determine their respective variable processing capabilities and determine whether the document interchange between these two terminals is feasible based upon these variable capabilities; the present invention is directed to this need.

DISCLOSURE OF THE INVENTION

The present invention is directed to a document distribution system having a network of communicating data processing stations which vary in number and particularly vary dynamically in their respective processing capabilities. The present invention provides improved means for determining document interchange protocols between any two processors in the network. The invention comprises means whereby any processor may establish a communication linkage with any other processor in the network and means whereby one of said two linked processors may present its data processing capabilities to the other over said linkage. Means are then provided wherein these presented data processing capabilities may be compared between the two linked processors. Means are provided for then determining document interchange protocols based upon capabilities common to both of the processors and for generating dynamically variable protocols based upon these common capabilites.

More particularly, the present invention is directed to document distribution systems wherein communicating processor work stations each have means for receiving and transmitting a data stream including a document interchange architecture predefining fixed protocols common to all of the communicating processors. The network further includes means for defining variable protocols to be used in combination with said fixed protocols. These variable protocols are determined and generated based upon common data processing capabilities between any pair of linked communicating processor work stations resulting from the above described comparison.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
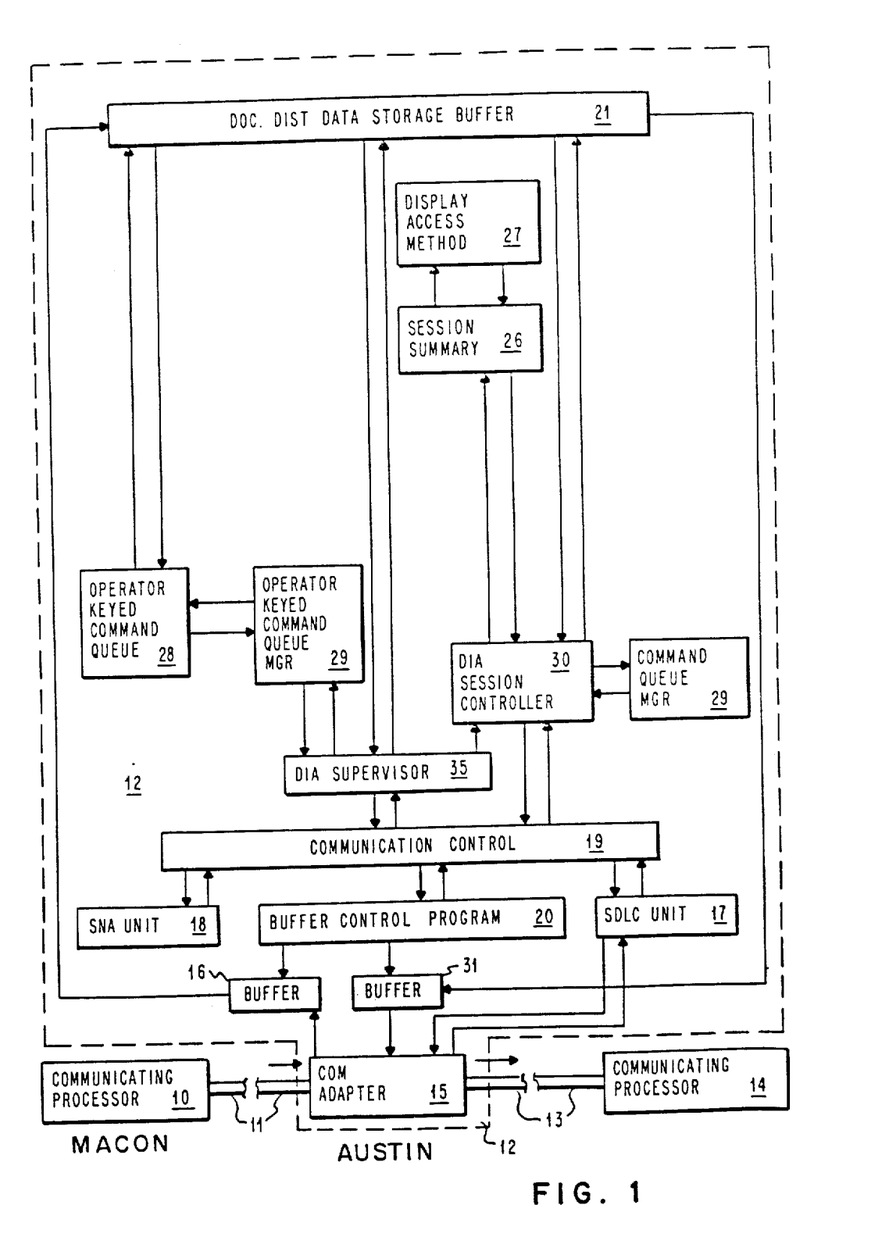
FIG. 1 is a logical block diagram showing the apparatus which may be used in the practice of the present invention.

With reference to the generalized apparatus of FIG. 1, the system of the present invention will now be described. Communicating processor 12 is respectively linked to communicating processor 10 and communicating processor 14 via linkages 11 and 13. For purposes of the present illustration, logic equivalent to that shown in detail in communicating processor 12 to be hereinafter described will also be considered to be present in both communicating processors 10 and 14. Also, linkages 11 and 13 will be considered to represent potential linkages in a document distribution network with the understanding that in order for any pair of communicating processors in a network to communicate with each other, the linkages between a pair of processors must be activated through conventional systems network architecture and data link control protocols to be hereinafter described. Processors 10, 12 and 14 and communication linkages 13 and 11 are part of a document distribution network of the type described in the above mentioned M. R. DeSousa and T. Schick et al publications and particularly in the Schick et al publication.

For purposes of the present embodiment, the illustrative communications network being here described will be considered to be a system in the Systems Network Architecture (SNA) environment described in the Schick et al publication. The present description will concern itself primarily with the functioning of communicating processor 12 in any communications sessions or linkages. These will be described with respect to communication from processor 12 over linkage 11 to processor 10. For purposes of this illustration, let us assume that communicating processor 12 is in Austin, Tex. and that communication linkage is to be established with communicating processor 10 which is in Macon, Ga. In the description which follows, we will discuss systems network architecture required to support the proposed linkage between Austin and Macon as well as the data link control which must be established for this linkage. We will then consider the specifics of the data streams being communicated between processors 12 and 10 over linkage 11. Since the comparison involved in the present invention as well as the generation of exchange protocols relates to document distribution or document interchange architecture (DIA), it will be considered with respect to that portion of the data stream. The arrangement of a typical data stream illustrated by the data streams described in the above mentioned Schick et al article will be subsequently discussed in greater detail with respect to FIG. 5 of the Drawings which is based upon a figure appearing at page 225 of the Schick et al article.

Figure 5:
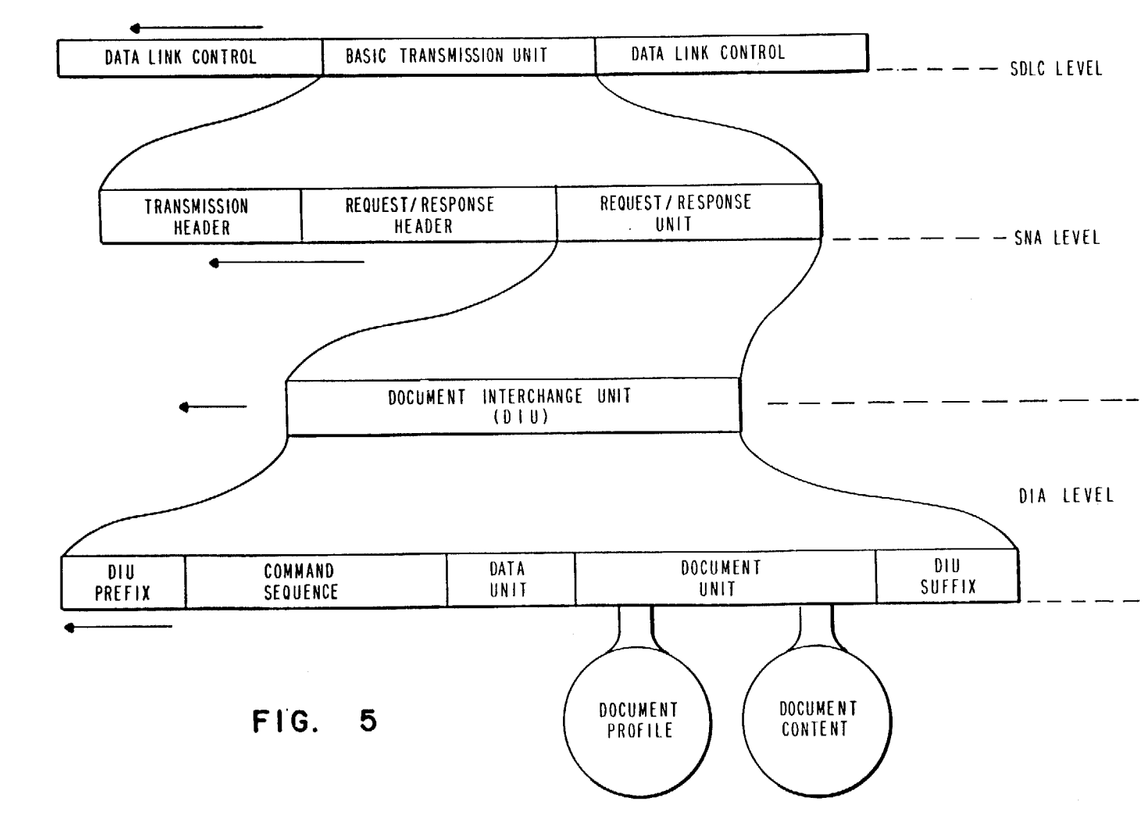
FIG. 5 is a diagrammatic representation of a data stream with its units and subunits broken down to the level dealt with in the present invention.

In any event at the start, let us assume that a data stream like that shown in FIG. 5 is transmitted over linkage 11 from communicating processor 10 and received by communications adapter 15 in processor 12. Communications adapter may be any standard device having the capability of converting received serial data communicated over linkage 11 to parallel form so that it may be handled in processor 12. The establishment of the linkage will be now described with respect to the apparatus of FIG. 1 using the flow chart of operations shown in FIG. 2. The operation is initiated by the operator at communicating processor 10. First, step 40, a data link control session must be established. The data stream received through communications adapter 15 (FIG. 1) is stored in a receive buffer 16 while the synchronized data link control (SDLC) unit 17 determines that the data link control elements in the received data stream as shown in FIG. 5 at the SDLC level of the data stream are proper. If they are proper, then a determination is made as to whether the data stream meets systems network architecture requirements. This is done by the SNA unit 18 which determines whether the transmission header of the basic transmission unit (at the SNA level of FIG. 4) is correct. The activities of the SDLC unit 17 and the SNA unit 18 with respect to the received information in buffer 16 is synchronized through the communications control unit 19 through the buffer control program unit 20 which controls the buffer 16.

In establishing SNA session the apparatus typically performs in the following manner. First, (FIG. 2) decision step 41, a determination is made as to whether it has been predetermined that Austin is to be the primary communicating processor in the exchange with processor 10 in Macon, Ga. If Austin is the primary processor, then, step 42, a bind request is sent from communicating processor 12 to communicating processor 10 in Macon. In accordance with conventional systems network architecture protocols, this bond request includes ID or logical name of communicating processor 12 in the overall document interchange network, the type of communication session proposed, as well as a variety of conventional systems network architecture management details. In response, communicating processor 12 receives from communicating processor 10 its bind response, step 43. Conversely, if communicating processor 12 is not the prime communicating processor but rather processor 10 is, then, step 44, processor 12 will receive the bind request from processor 10 and, step 45, then send its bind response to processor 10. In these operations, communicating processor 10 will be assumed to have the same logical apparatus shown in FIG. 1 with respect to processor 12 and that processor 10 will operate in substantially identical fashion.

Then, if the received and sent bind request are appropriate and acceptable, step 46, the systems network architecture communication session between processors 10 and 12 is commenced or activated. System network architecture (SNA) protocols divide a session into two states a Contention state wherein the communicating processor is awaiting information and a Conversation state wherein actual transmission of information or data in the form of a data stream is taking place. In commencing the SNA session, the communication control unit 19 (FIG. 1) transfers that portion of the data stream stored in receive buffer 16 into document distribution storage buffer 21 and relinquishes control of the session to DIA supervisor unit 35. Now under the control of the DIA supervisor unit, the operation of the present invention to be described with respect to the flow chart in FIG. 1 will be carried out. First, the DIA supervisor unit makes a determination as to whether the basic document interchange unit (DIU) as shown in FIG. 5 is present in the data stream. If this basic DIU unit is not present, an error condition will be indicated. If the DIU unit is present then the command sequence portion of the data stream (FIG. 5) which is stored in the document distribution buffer 21 is examined under the control of the DIU supervisor unit 35 in FIG. 1.

Figures 2, 4:
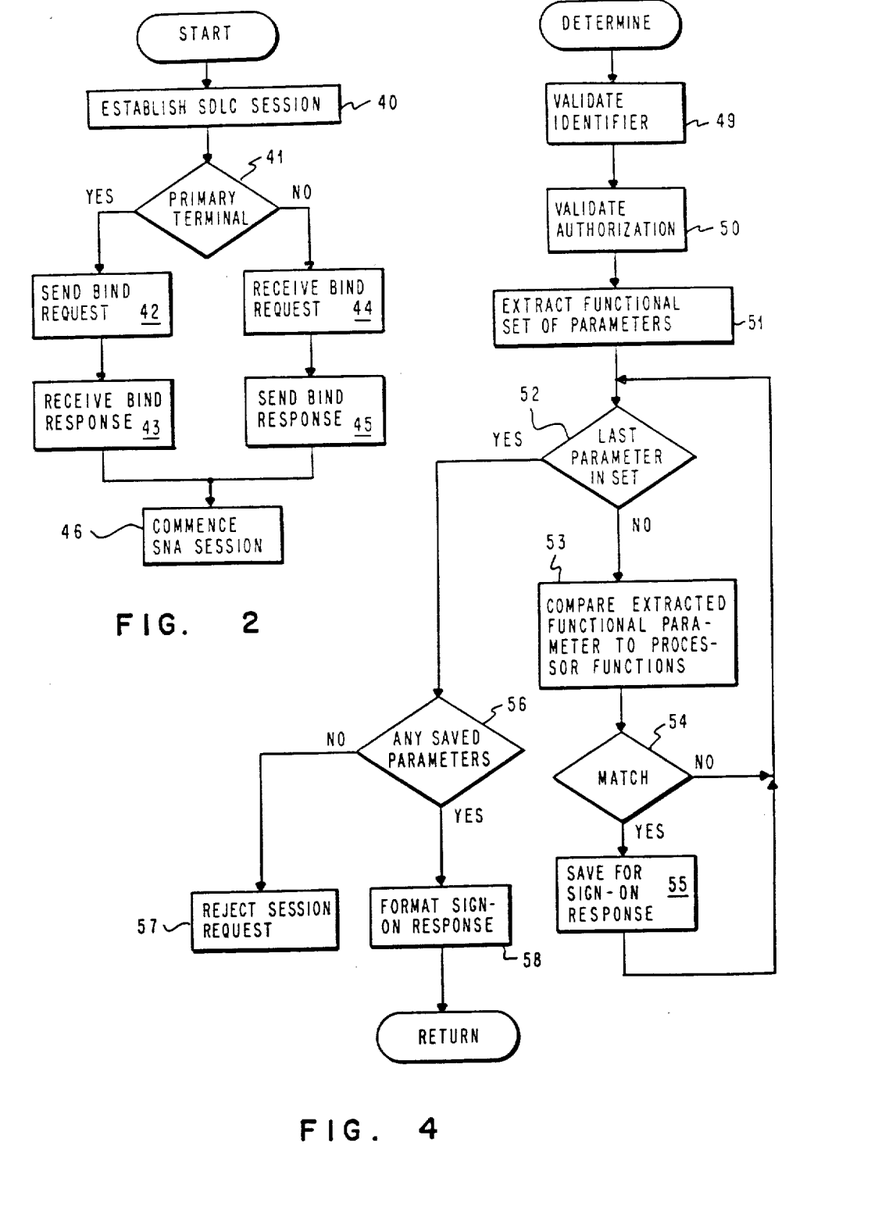
FIG. 2 is a very genealized flow chart showing the general steps involved in a document distribution network to establish a linkage between selected pair of communicating processors.
FIG. 4 is a flow chart of the operations involved utilizing the apparatus of FIG. 1 wherein one of a pair of linked processors which has received the data stream indicative of the variable data processing capabilites of the other processor conducts a comparison in order to determine whether any of these varialbe capabilities are also common to the receiving processor.
Figure 3:
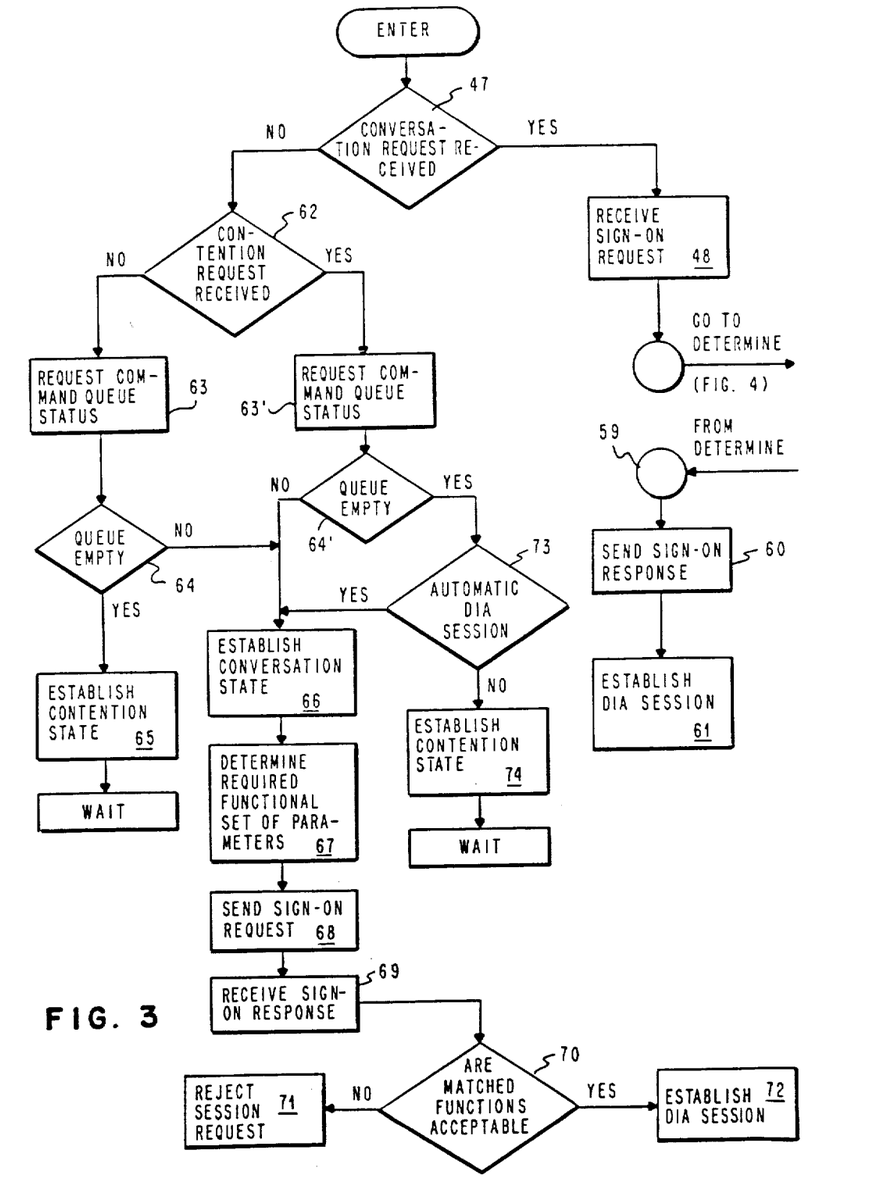
FIG. 3 is a flow chart of the operation utilizing the apparatus of FIG. 1 whereby a pair of linked communicating processors exchange the data stream which is to be compared in order to establish whether there are any varialbe data processing capabilities common to the pair of linked processors.

The operations with respect to scanning of the command sequence in order to determine whether there are any data processing capabilities common to both communicating processors 10 and 12 will now be considered with respect to the operational flow chart show in FIG. 3. For convenience in explanation let us assume that communicating processor 12 has received the data stream from communicating processor 10. First, decision step 47, a determination is made by DIA supervisor 35 to whether the command sequence stored in buffer 21 contains a Conversation request, i.e., communicating processor 10 has requested a Conversation state indicating that it has data to convey. If this Conversation request has been received, then step 48, the DIA session controller 30 (FIG. 1) will receive the sign-on request commands in the command sequence of the data stream stored in buffer 21. Then, under the control of DIA session controller 30, the operation will go to the "Determine" process as set forth in the flow chart of FIG. 4. First, step 49, the identifier in the receive command sequence will be validated, after which the authorization in the command sequence will be validated, step 50.

Next, step 51, the functional set of parameters which are indicative of the functions which communicating processor 10 would like to have performed by receiving processor 12 on the document being interchanged are extracted and examined under the control of DIA session controller 30. For example, let us assume that communicating processor 10 wishes to forward a document to communicating processor 12, and communicating processor 10 further wishes processing to be performed on this communicated document which requires three functional capabilities in processor 12: (1) distribution service capability, (2) application processing service capability and (3) library service capability (the ability to store and retrieve information related to the document from archival storage). A set of functional parameters will be considered in the following operations still under the control of the DIA session controller. First, decision step 52, a determination is made as to whether the previous parameter processed was the last parameter in the set of three. If it was not, then, step 53, comparison is made as to whether processor 12 is capable of performing this extracted functional parameter. If there is a match with a function processor 12, decision step 54, the matched parameter is saved for sign-on response which is to be made back to processor 10, step 55, and the operation is returned to step 52. If there is no match, the operation is directly returned to step 52.

Considering now how this comparison for matching parameters is made, the operation is still carried out under the supervision and control of DIA session controller 30 in processor 12. In making the comparison in step 53 with parameters which processor 12 is capable of performing these functions may be stored at any convenient point within the memory of processor 12. The storage may be in some sort of tabular or list form, and when a comparison is made with respect to a particular requested function the stored list is accessed. For purposes of the present description we have not gone into details concerning the memory of processor 12. For this embodiment let us consider processors 10 and 12 to be communicating display processor of the type detailed in co-pending application of D. G. Busch entitled "Data Communications System with Receiving Terminal for Varying the Portions of the Received Data Being Displayed", Ser. No. 274,050 assigned to the assignee of the present invention and filed on June 16, 1981 in the U.S. Patent Office, now U.S. Pat. No. 4,577,288. While this co-pending application uses an asynchronous protocol for communication and the present invention uses synchronous protocol, the general operation of the terminal with respect to display and printing operations will be substantially the same. It should be noted that since communicating processor 12 is a display terminal processor, if the display is to be utilized it may be accessed through session summary logic 26 and display access method 27.

In any event, a list of functional parameters which processor 12 is capable of performing may be stored in the memory of a display processor like that of the D. G. Busch co-pending application. Likewise, any matched functional parameters saved for the sign-on response in accordance with step 55 may also be stored in the display processor memory.

When a determination is made in decision step 52 that last parameter in the requested functional set has been compared, then a determination is made in decision step 56 as to whether there have been any functional parameters saved as a result of there having been a match in step 54. If there has not been any, then step 57 the session request is rejected, i.e., the processor 12 advises processor 10 that it cannot perform any of the requested document function and thus rejects the session. On the other hand, if a determination is made in decision step 56 that there have been some saved parameters resulting from a match, then, the sign-on respond from processor 12 back to processor 10 indicating that processor 12 can perform some of the requested document handling functions is formatted and the process is returned to point 59 in the flow chart of FIG. 3. Following through with our example, let us assume that of the three requested functions set forth above as having been communicated from processor 10 to processor 12, processor 12 has the capability of performing (1) the distribution function and (2) the application processing function. However, processor 12 has no capability at the point in time that the present communication is made for (3) library services or archival access purposes. The situation may be the result of processor 12 not having any present library services capability, or processor 12 may time-share such a library sevices capability on a host processor, and at the time the request is made processor 12 does not have any time available on the library services program.

Thus, step 60 (FIG. 3), processor 12 sends a sign-on response back to processor 10 indicating that of the three requested functions, processor 12 has the capability to only perform (1) distribution and (2) application processing services.

Then, step 61, processor 12 goes on to establish a document interchange session. Actually, processor 12 establishes its half of the DIA session, i.e., a DIA-half session. Processor 12 sets up its half of document interchange protocol so that if the sign-on response sent to processor 10 is acceptable, i.e., processor 10 will accept the performance by processor 12 for only the (1) distribution and (2) application processing functions, processor 10 may then go on to establish its half of the DIA session thus completing the establishment of the DIA session. Then, processor 10 may commence the transmission of the document or documents to be transmitted to processor 12.

Returning now to decision step 47 in flow chart of FIG. 3, if the determination as previously made by the DIA supervisor 35 as to whether the command sequence in the data stream received from processor 10 and stored in buffer 21 of processor 12 contains a Conversation request is negative, then a determination is made, decision step 62 as to whether command sequence in the stored data stream contains a Contention request. This represents an indication from processor 10 that processor 10 has no data to transmit but is awaiting data if processor 12 has any documents to transmit to processor 10. If there is no Contention request from processor 10, then, step 63, processor 10 requests its command queue status. The operator on processor 12 has the capability of keying into processor 12 commands related to documents which processor 12 wishes to transmit to processor 10 when a DIA session is established. These are stored in a command queue 28 in processor 12. This command queue is under the control of a command queue manager 29. In carrying out step 63, the DIA supervisor 35 has command queue manager 29 determine the status of command queue 28. If, decision step 64, a determination is there made that the command queue is empty, then, step 65, we have a situation wherein a systems network architecture communication linkage has been established between processors 10 and 12 but neither has any documents to communicate. Accordingly, in step 65, processor 12 establishes an SNA Contention state with processor 10 and proceeds to wait for any subsequent document communication between these two processors which may be forthcoming.

On the other hand, if in decision step 64, a determination is made that queue 28 is not empty, i.e., the operator of processor 12 has keyed in documents and associated commands to be sent to processor 10, then, step 66, an SNA Conversation state is establshed with processor 10. Next, step 67, processor 12 determines what functions are to be performed on the documents keyed into queue 28. These function requests may be keyed in by the operator when the documents and commands are keyed in through command queue 28 or they may be stored somewhere in processor 12 as predetermined standard functions which processor 12 needs to have performed with respect to particular documents. In any event, this determination is made by DIA supervisor 35 (FIG. 1). After this determination, processor 12 then proceeds to send a sign-on request, step 68, to processor 10. This sign-on request is formulated in document distribution data storage buffer 21 under the control of DIA session controller 30 and transmitted from processor 12 through send buffer 31 and communications adapter 15. This sign-on request will be indicative of the documents and comands which are in the command queue as well as the required functional set of parameters which processor 12 requests processor 10 to perform.

This sign-on request sent from processor 12 will be received in processor 10 and treated as a received sign-on request in the manner previously described in step 48. Processor 10 will then proceed with the "Determine" process described in the flow chart of FIG. 4 wherein the functional parameters which processor 10 is capable of performing are compared to the functional set of parameters requested by processor 12 in the communication. If processor 10 can perform none of the requested functional parameters, it will issue a reject session request message 57 back to processor 12. On the other hand, it can perform some of the parameters as determined by decision step 56 it will format a sign-on response 58 which will be transmitted back to processor 12. This sign-on response will be received, step 69, FIG. 3 by processor 12 where it will be stored in document distribution data buffer 21 under the control of DIA session controller 30.

Then, a determination will be made, decision step 70, as to whether the matched functions, i.e., the combination of requested functions which processor 10 can perform is acceptable to processor 12. This determination will be made based upon either what the operator has keyed in to command queue 28 or predetermined decision data previously stored in processor 12. If the matched functions are not acceptable, then, step 71, processor 12 will communicate back to processor 10 that the communication session is rejected. On the other hand, if the combination of functions which processor 10 can perform is acceptable, then, step 72, processor 12 will proceed to establish its half of the DIA session which thus provides for a complete DIA session between processors 12 and 10.

At this point, we will return to decision step 62 in the flow chart of FIG. 3. An SNA session has alredy been established between communicating processors 10 and 12. However, processor 12 has not received a Conversation request from processor 10. If then, decision step 62, it is determined that a Contention request has been received from processor 10 which indicates that processor 10 wishes to receive anything which is or may become available from processor 12, the status of the keyed command queue is requested, step 63', carried out in the same manner as previously described step 63. If then, a determination is made, step 64', that there is something in the queue, the process branches to step 66, and steps 66 through 72 are carried out in the manner described hereinabove. On the other hand, if in step 64', the queue is empty, then a determination is made, decision step 74, as to whether an automatic DIA session should be established. For many applications, it may be customary to preset the conditions within a communicating processor like processor 12 so that whenever a Contention request is received from another processor to automatically proceed to establish a document interchange session with that processor even if the command queue is empty. If this is the present status of processor 12, then, the positive decision from step 73 will branch the process again to step 66 and the process will proceed through steps 66 through 72 to attempt to establish a DIA session. On the other hand, if the resulting decision is negative, then, the process will proceed to step 74 to establish a Contention state as previously described with respect to step 65.

When a DIA session is established, processors 10 and 12 will communicate with each other using interchange protocols sufficient to handle the (1) distribution and (2) application processing functions but not (3) library services functions.

While the invention has been particularly shown and described with reference to a preferred embodiment it will be understood by those skilled in the art that various other changes in form and detail may be made without departing from the spirit and scope of the invention.

I claim:

1. In an electronic document distribution network having a variable number of communicating data processors, a method for dynamically determining an optimal set of functional parameters for document interchange between two processors comprising the steps of:
    establishing a communications linkage between a first processor and a second processor;
    presenting, by said first processor, a set of functional parameters of said first processor to said second processor over said linkage;
    matching, by said second processor, a set of functional parameters of said second processor to said set of functional parameters of said first processor;
    presenting, by said second processor to said first processor, a set of common functional parameters common to both said first processor and said second processor;
    comparing, by said first processor, said set of common functional parameters with predetermined minimum acceptance criteria; and
    determining dynamically, by said first processor, based on the result of said comparing step, the acceptability of said set of common functional parameters for document interchange.

2. The method according to claim 1, further comprising the steps of:
    establishing a document interchange session based upon the result of said determining step; and generating a document based upon said set of common functional parameters.

3. The method according to claim 1, further comprising the step of:
    rejecting a document interchange session based upon the result of said determining step.

4. In an electronic document distribution network having a variable number of communicating data processors, a method for dynamically determining an optimal set of functional parameters for document interchange between two processors comprising the steps of:
    establishing a communications linkage between a first processor and a second processor;
    presenting, by said first processor, a set of functional parameters of said first processor to said second processor over said linkage;
    matching, by said second processor, a set of functional parameters of said second processor to said set of functional parameters of said first processor;
    presenting, by said second processor to said first processor, a set of common functional parameters common to both said first processor and said second processor;
    comparing, by said first processor, said set of common functional parameters with dynamic user-defined minimum acceptance criteria; and
    determining dynamically, by said first processor, based on the result of said comparing step, the acceptability of said set of common functional parameters for document interchange.

5. The method according to claim 4, further comprising the steps of:
    establishing a document interchange session based upon the result of said determining step; and
    generating a document based upon said set of common functional parameters.

6. The method according to claim 4, further comprising the step of:
    rejecting a document interchange session based upon the result of said determining step.

* * * * *

UNITED STATES PATENT AND TRADEMARK OFFICE
CERTIFICATE OF CORRECTION

PATENT NO. : 4,648,061

DATED : March 3, 1987

INVENTOR(S) : Gregory J. Foster

It is certified that error appears in the above-identified patent and that said Letters Patent is hereby corrected as shown below:

Title page:

"[52] U.S. Cl. 264/900" should read "[52] U.S. Cl. --364/900--.

| | |
|---|---|
| Col. 3, line 63 | Change "genealized" to --generalized--. |
| Col. 4, line 3 | Change "varialbe" to --variable--. |
| Col. 5, line 39 | Change "bond" to --bind--. |
| Col. 8, line 44 | Change "establshed" to --established--. |
| Col. 8, line 61 | Change "comands" to --commands--. |
| Col. 9, line 44 | Change "74" to --73--. |

Signed and Sealed this

Eleventh Day of August, 1987

*Attest:*

DONALD J. QUIGG

*Attesting Officer*  *Commissioner of Patents and Trademarks*